United States Patent [19]

Galan

[11] Patent Number: 5,274,355
[45] Date of Patent: Dec. 28, 1993

[54] SYSTEM FOR MONITORING PRESSURE AND TEMPERATURE OF PNEUMATIC TIRES ON A MOVING VEHICLE

[76] Inventor: Louis Galan, 4030 W. Loch Alpine, Ann Arbor, Mich. 48103

[21] Appl. No.: 831,497

[22] Filed: Feb. 5, 1992

[51] Int. Cl.⁵ ............................................. B60C 23/00
[52] U.S. Cl. .................................... 340/445; 340/444; 340/449; 340/557; 340/442; 73/146.5; 73/705; 116/34 R
[58] Field of Search ............... 340/445, 442, 443, 444, 340/449, 555, 556, 557; 73/146.4, 146.5, 705; 116/34 R

[56] References Cited

U.S. PATENT DOCUMENTS

| | | |
|---|---|---|
| 2,761,411 | 9/1956 | Pross et al. |
| 4,004,272 | 1/1977 | Claxton et al. ............... 340/445 |
| 4,086,564 | 4/1978 | Claxton ............... 340/445 |
| 4,160,234 | 7/1979 | Karbo et al. |
| 4,180,794 | 12/1979 | Claxton ............... 340/443 |
| 4,517,834 | 5/1985 | Luke ............... 73/146.5 |
| 4,717,905 | 1/1988 | Morrison, Jr. et al. |
| 4,752,141 | 6/1988 | Sun et al. ............... 73/705 |
| 4,807,468 | 2/1989 | Galan . |
| 4,819,686 | 4/1989 | Achterholt ............... 116/34 R |
| 5,035,137 | 7/1991 | Burkard et al. |
| 5,127,269 | 7/1992 | Grudzien, Jr. ............... 73/705 |

Primary Examiner—John K. Peng
Assistant Examiner—Nina Tong
Attorney, Agent, or Firm—Harness, Dickey & Pierce

[57] ABSTRACT

A tire pressure and temperature monitoring system for measuring tire inflation pressure and anomalous temperature of rotating tires in a moving vehicle by means of optoelectronic devices located in the stationary structure of the vehicle and an elastic diaphragm that rotates with the wheel and tire. The combined use of optoelectronic components and elastic diaphragms, provides a marked improvement in performance, reliability and cost over previously disclosed magnetic or radio frequency pressure measurement systems. The optoelectronic detector elements are also used to identify those tires whose side wall temperature is significantly higher than the side wall temperature of the other tires. In addition, the system can also be used as a measurement of individual wheel rotational speed and related wheel motion. Alternatively, fiber optic cables can be used to transmit light from a single light source to lenses mounted adjacent each tire and to transmit the reflected energy to remotely located optoelectronic devices.

24 Claims, 4 Drawing Sheets

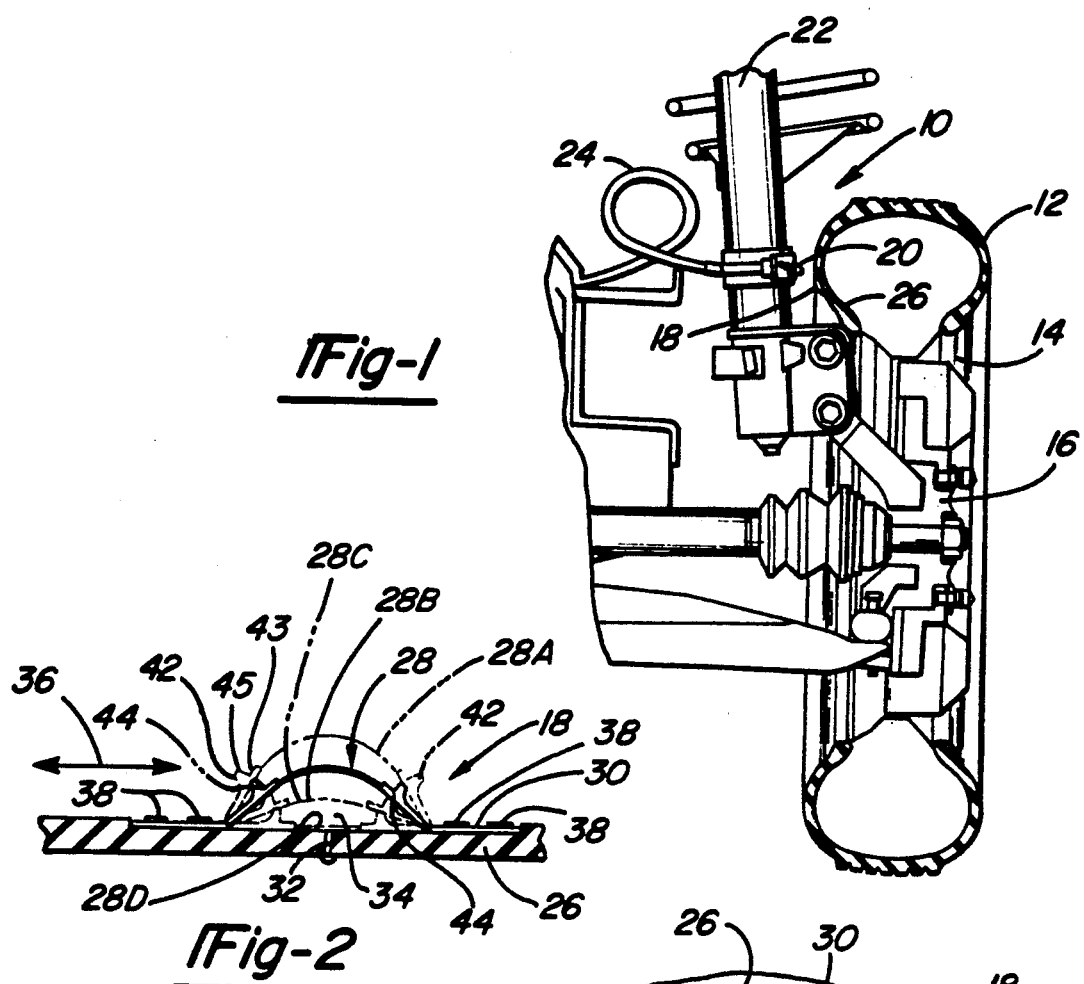
Fig-1
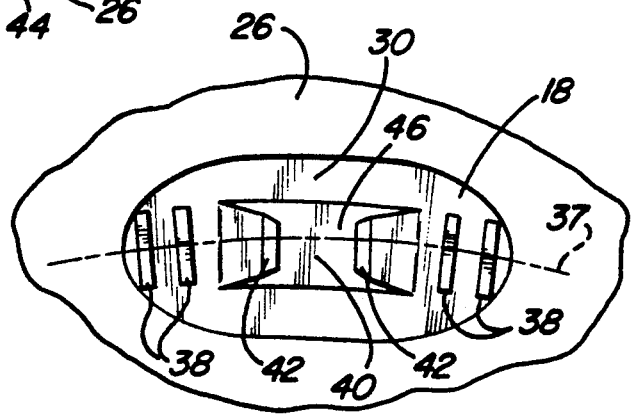
Fig-2
Fig-3
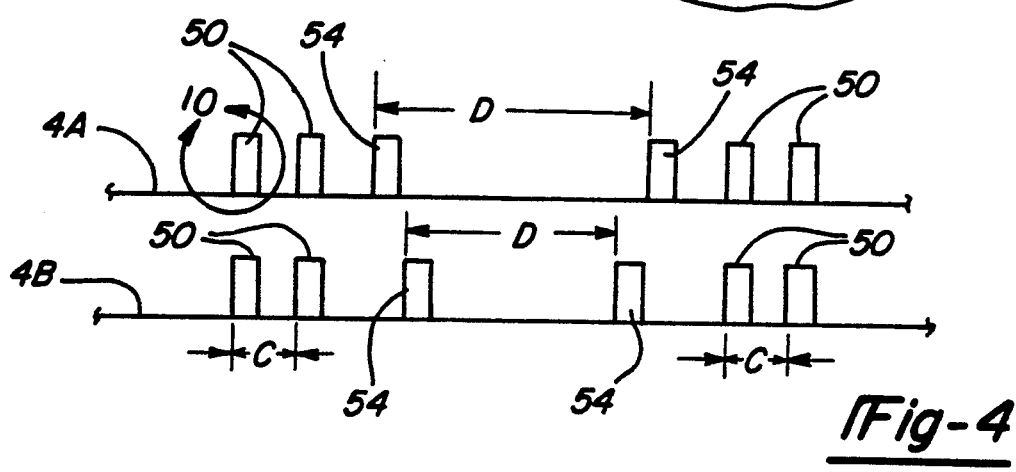
Fig-4

SYSTEM FOR MONITORING PRESSURE AND TEMPERATURE OF PNEUMATIC TIRES ON A MOVING VEHICLE

BACKGROUND AND SUMMARY OF THE INVENTION

The present invention relates to a system for monitoring the inflation pressure and anomalous temperature of rotating tires on a moving vehicle and in particular to a system for monitoring the pressure and temperature utilizing optoelectronic components located on the stationary structure of the vehicle and on an elastic diaphragm in the tire side wall or the wheel rim.

Pneumatic tires for automotive vehicles are designed for certain inflation pressures and load ranges. Both over inflation and under inflation can have consequences detrimental to tire life and performance. Over inflation can be avoided by the exercise of due care at the time of tire inflation. The only way to guard against prolonged periods of under inflation, however, is by frequently checking the pressure. The visual observation of a tire as an indicator of under inflation is not reliable, especially with radial tires. The manual checking of each of the four tires on an automobile with a tire pressure gauge is considerably more accurate than visual observation, but involves a considerable expenditure of effort. Experience has indicated that it is unrealistic to expect that a typical vehicle owner will perform this degree of maintenance on a frequent basis. At best, tire pressure checking will be done randomly, if at all.

The owners and operators of commercial vehicles and particularly fleets are affected on a much larger scale by under inflated tires and hence, are more prone to perform tire pressure checking on a more regular basis than most people do on their personal vehicle However, in the course of checking inflation pressures, there will doubtless be many tires that are found to be properly inflated and therefore, the time involved in checking these tires is an extra expense to the fleet owner. Several methods for measuring and transmitting tire inflation pressures to a vehicle operator have been reported in the technical literature. The tire inflation pressure measurement methods previously recorded fall into two categories: 1) those that require piercing of the tire rim; and 2) those that do not require piercing of the tire rim. Because pneumatic tires already have one hole pierced in the rim for the valve stem, the addition of a second hole in the rim for the inflation pressure sensor doubles the likelihood of leaks occurring. However, piercing of the tire rim is necessary for sensors that are attached to the exterior surface of the wheel, such as those commonly used in connection with magnetically coupled transmitters.

Magnetically coupled devices require a very small air gap between the rotating magnetics mounted to the rim and the stationary detector mounted to the vehicle structure in order for the device to work properly. The size of the air gap required is often less than one tenth of an inch. A further problem is that even small changes in the size of the air gap over time have a very significant affect on calibration of the system. It is difficult to establish and maintain such a small air gap due to variations in the run out, or evenness of the rim plane, from one wheel to another, and changes in the dimensions caused by variations in the ambient temperature.

Sensors that are attached inside the rim, or imbedded in the rubber side wall of the tire, do not require rim piercing. These sensors require radio frequency transmitters with rotating power sources attached to the wheel and a receiving antenna fixed to the nonrotating vehicle structure. Such devices add considerable complexity and cost to the system.

It is an object of the present invention therefore, to provide a tire pressure measuring and transmitting system which avoids the complexity of a radio frequency transmitter and power source mounted to the inside of the rim.

It is an advantage of the tire monitoring system of the present invention that in a preferred embodiment, additional piercing of the wheel rim is avoided.

It is a further advantage of the tire monitoring system of the present invention that the gap between the stationary sensor and the rotating tire need not be precisely controlled. This allows for normal variations between tires, rims and mounting structure.

The pressure measuring and transmitting system of the present invention utilizes an optical reflective indicator imbedded in the side wall of a tire and therefore does not require piercing of the rim. Optoelectronic emitter and detector assemblies are located on the non-rotating vehicle structure and therefore do not require power sources to rotate within the wheel. The method of data transmission by means of the optical reflective indicator in the tire side wall eliminates the requirement for the precise air gap used with the magnetically coupled devices. The emitting and receiving apparatus of the optoelectronic emitter and detector assemblies can be located further from the tire, one inch or more, and changes in the distance between the apertures and the tire do not effect calibration.

The system of the present invention consists of an inflation pressure indicator that is preferably mounted to the side wall of a tire and a laser diode emitter and detector assembly and electronics mounted to the non-rotating structure of the vehicle. The laser diode emits an electromagnetic signal, such as light radiation, that is reflected by the indicator back to the detector where the signal is processed by the system electronics and the tire pressure displayed to the vehicle driver. The system is operated in two modes, one mode is used to read the reflected signal for determining inflation pressure and in the other mode, the emitter is turned off and the overall infrared thermal emission from the tire side wall is read to identify tires with temperature anomalies.

The tire temperature monitoring is intended to provide primarily a warning of eminent danger. The most frequent occurrence involves one tire failure as opposed to all tires failing at the same time. Therefore, the system determines a temperature difference or anomaly between the tires rather than attempting to measure the tire absolute temperature which would require a much higher sensitivity for the detector in the longer wavelengths. The temperature sensing described herein identifies a tire whose thermal emission exceeds the average thermal emission of all tires by a specified amount.

As an alternative to placing an optoelectronic emitter and detector assembly at each wheel with an emitting diode and detector, a single light source can be used and transmitted to each wheel site through a fiber optic cable which terminates at a lens assembly whose aperture is oriented to illuminate the rotating pressure indicator. A second cable can be used to transmit the reflected signals to a central processing unit where the detectors are located.

Further objects, feature and advantages of the invention will become apparent from a consideration of the following description and the appended claims when taken in connection with the accompanying drawings.

BRIEF DESCRIPTION OF THE DRAWINGS

FIG. 1 is a sectional view of a portion of a vehicle front suspension and tire with the tire pressure and temperature monitoring system of the present invention installed thereon;

FIG. 2 is a sectional view through a tire side wall showing the tire pressure indicator of the present invention on the tire side wall;

FIG. 3 is a elevational view of the tire side wall showing the inflation pressure indicator;

FIGS. 4 and 5 are timelines illustrating the signals produced by the tire inflation pressure monitoring system of the present invention;

DETAILED DESCRIPTION OF THE INVENTION

Figure 5:
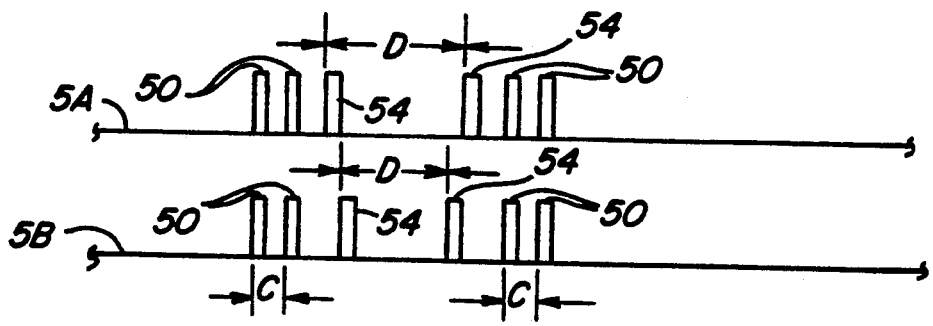

The tire pressure and temperature monitoring system of the present invention is shown in FIG. 1 installed in a motor vehicle and designated generally at 10. The system 10 is used to measure the inflation pressure of tire 12 mounted to wheel rim 14 which is in turn bolted to the hub assembly 16 of a motor vehicle. The monitoring system 10 includes a pressure indicator 18 on the inner side wall of the tire 12 and a optoelectronic emitter/detector assembly 20 mounted to a stationary structure of the vehicle. By stationary structure, it is meant a nonrotating portion of the vehicle. As shown in FIG. 1, the emitter/detector assembly 20 is mounted to a lower end of vehicle strut 22. While the strut does not rotate, the lower end does move with deflection of the vehicle suspension in harmony with the wheel rim such that the emitter/detector field of view of the pressure indicator does not change. A shielded cable 24 provides electronic power to the emitter/detector assembly 20 and returns a detected signal back to the system electronics as described below.

Pressure indicator 18, as shown in FIGS. 2 and 3, is an elastic diaphragm 28 made of rubber or similar elastomer. The periphery 30 of the diaphragm is imbedded in or bonded to the side wall 26 of tire 12 A small rigid opening 32 extends through the tire side wall 26 enabling the interior of the tire to communicate with the small cavity 34 formed by the diaphragm. The diaphragm 28 is elastic enough that noticeable expansion and contraction of the diaphragm surface will take place in response to inflation pressure changes over the normal pressure ranges expected to be encountered with the tire 12.

The direction of tire rotation is shown by arrow 36. The tire can be rotated in either direction of the arrow. The axis 37 of the diaphragm 30 is slightly curved to follow a concentric circle around the axis of rotation of the tire 12. The periphery 30 contains a pair of flat, reflective stripes 38 on each side of the diaphragm center portion 40 along the axis 37. The stripes are made to reflect certain wavelengths of electromagnetic radiation, particularly in the visible and near infrared range. The reflective stripes contrast with the background in their reflective ability. The stripes 38 in each pair are spaced apart from one another a fixed distance to define a reference dimension.

The bulging portion of the diaphragm 40 includes another pair of reflective stripes 42. Stripes 42, by being on the surface of the diaphragm, move relative to one another as the elastic diaphragm expands or contracts, the spacing between the stripes 42 changes in relation to the tire inflation pressure. This is illustrated in FIG. 2 where the diaphragm 28 is shown in four different positions corresponding to different inflation pressures. The outermost position 28A represents the highest pressure condition. The remaining positions 28B, 28C and 28D show progressively lower inflation pressure conditions. As the pressure changes, the spacing between the reflective stripes 42 changes, particularly in the direction of tire motion shown by arrow 36.

The spacing between the stripes 42 represents a pressure measurement dimension. The stripes 42 are each formed by two adjacent surfaces, 43, 45 that are perpendicular to one another, thus forming a radial groove. At the joinder of the two surfaces 43, 45, a corner 44 is formed. The two surfaces preserve the intensity of the reflected radiation in the direction of the detector aperture in their various positions as the diaphragm flexes. The center of the diaphragm 46 between the corner reflective stripes is made thinner, to be more elastic, than the remainder of the bulging portion 40 axially outward from the stripes 42. This enables the diaphragm to flex more between the two stripes 42 then outside of the stripes. This enhances the displacement of the stripes 42 for a given pressure change and improves the accuracy of the pressure measurement.

The emitter/detector assembly 20 includes a laser diode that emits electromagnetic radiation directed toward the tire side wall. As the indicator 18 rotates past the emitter/detector assembly 20, the emitted radiation is reflected by the stripes 38 and 42 back to the detector which includes a photo diode or similar device that produces a signal in response to incident radiation. A suitable infrared light emitting diode is available from Motorola as No. MLED-77 while suitable photo detectors are also available from Motorola as No. MRD-300 and MRD-360 depending on the desired sensitivity in the near infrared spectral range. The stripes contrast with the tire side wall background and thus reflect significantly more radiation, changing the signal produced by the detector in response to movement of the stripes past the detector. An electrical pulse is produced for each stripe passing the detector. FIGS. 4 and 5 illustrate a plurality of timelines showing the time separation between pulses for varying vehicle speeds and varying inflation pressures.

The two timelines 4A and 4B in FIG. 4 are both for a low vehicle speed while the two timelines shown in FIG. 5 are for a high vehicle speed. The upper timeline 4A shows the pulses produced by a high inflation pressure tire while the lower timeline 4B shows the pulses produced by a low inflation pressure tire. The two pulses 50 at both the left and right ends of timelines 4A and 4B represent the pulses produced by the flat stripes 38 at the two sides of the diaphragm. The vehicle speed is assumed to be the same for both time lines in FIG. 4; therefore, the time interval C between the two pairs of pulses 50 is essentially the same for both of the timelines. The center two pulses 54 are produced by the corner reflective stripes 42 of the diaphragm. With the high pressure timeline 4A, since the two reflective stripes are further spaced from one another, the time interval D between the two pulses 54 is greater than the time interval D between the pulses 54 of the low pressure timeline 4B.

The absolute time C between the pulses 50 and the absolute time D between the pulses 54 will depend upon the speed at which the indicator moves past the detector and hence, upon the rotation velocity of the tire. However, the ratio of the time interval D to the time interval C will be independent of the speed because the velocity will factor out when the ratio is taken. Hence, the ratio of the two measurements will be indicative of the actual tire pressure.

The two timelines 5A and 5B of FIG. 5 illustrate the pulses produced by high and low inflation pressure tires with a higher rotational speed than illustrated in FIG. 4. Because of the increased vehicle speed, the time intervals between the pulses is less than in FIG. 4. In addition, the time width of the pulses themselves is also reduced. Again, to compensate for vehicle speed, the ratio of the time interval D between pulses 54 to the time interval C between pulses 50 is used to determine the inflation pressure.

The indicator, as shown in FIGS. 2 and 3 includes two pairs of reflective stripes 38, one on each side of the movable pair of stripes 42. As a result, the system will first read a reference dimension time interval "C" between the first pair of stripes 38, a pressure measurement dimension time interval D between the stripes 42 and another reference dimension time interval C. Regardless, of the direction of rotation of the tire past emitter/detector 20, the first time interval will be the reference dimension and the second time interval will be the pressure measurement dimension.

Figure 10:
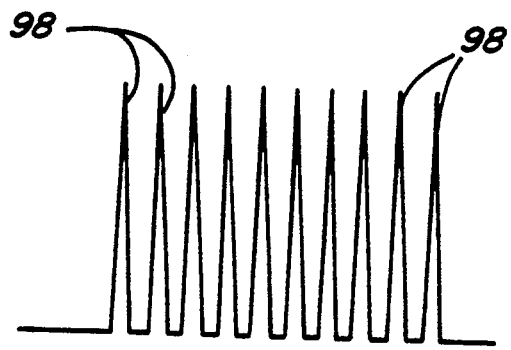
FIG. 10 is an enlarged view showing the pulsed signal reflected from the pressure indicator.

The laser diode output preferably is a pulsed output. A constant output can be used but the operating power required will be increased. A pulsing frequency within the range of 50 kHz to 7 mHz has been found to produce suitable resolution in the output signal to provide the required accuracy. Higher frequencies can easily be used as well. With a pulsed output, the reflected signal will not be a constant pulse but will be composed of several closely spaced spikes of short duration such as spikes 98 shown in FIG. 10. Preferably, the pulsing frequency of the laser diode emitter is related to the width of the reflective stripes such that for the maximum tire rotation speed of interest, a minimum of ten spikes will be reflected from each stripe as the stripe passes the emitter. Depending on where the leading edge of the stripe is in relation to the phase of the output signal, the first spike may miss the edge of the stripe, resulting in only nine reflected impulses. The exact location of the stripe leading edge is unknown and can be anywhere within the space between two spikes 98. Thus, the higher the frequency or the slower the rotation speed, the higher the system accuracy. With the frequency and stripe width set to produce ten reflected spikes at the highest speed of interest, the system accuracy will be within ten percent.

With sufficiently high resolution of the reflective stripes, the monitoring system can be operated with a pair of reflective stripes 42 and no reference dimension stripes 38. In such a system, the width of an individual stripe 42 serves as the reference dimension and the spacing between the two stripes 42 serves as the pressure measurement dimension as described above. Since the width of stripe 42 is the reference dimension, the reflective stripes 38 can be eliminated. Even though the actual width of a stripe 42 does not change with inflation pressure, the apparent stripe width from the detector location changes because the stripe plane tilts with respect to the fixed sensor axis as the diaphragm deflects. The error introduced by the tilt effect, however, is less than 10% for tilt angles below 25 degrees. The magnitude of the tilt angle encountered at the edges of the diaphragm where the stripes are likely to be located is dependent on the aspect ratio of the elastic component, i.e. the ratio of the radial deflection to the circumferential length.

The emitter/detector assembly 20 as shown in FIG. 1 is mounted to a part of the nonrotating vehicle structure that shares the same suspension as the tire. This condition will ensure that the tire side wall site where the elastic diaphragm is located will always pass through the field of view of the emitter/detector 20 as the wheel rotates.

Figure 8:
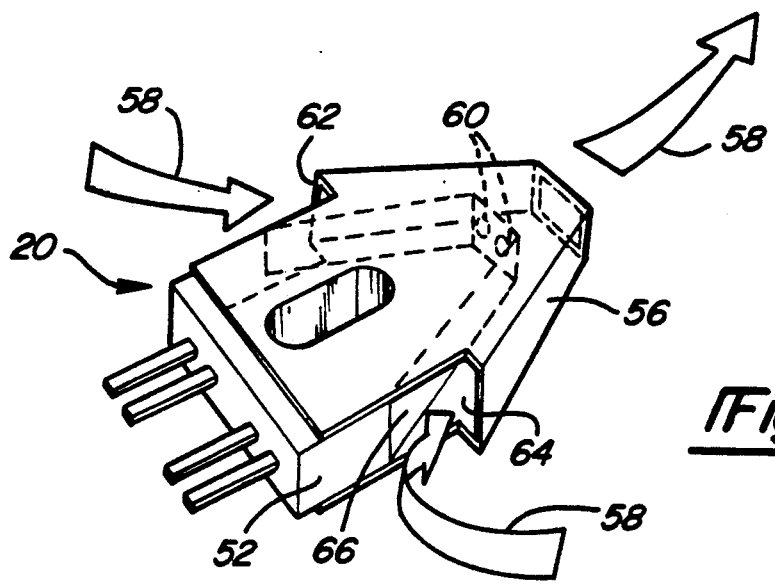
FIG. 8 is a perspective view of a optoelectronic emitter/detector assembly used in the present invention.

The emitter/detector 20 includes a housing 52 that is installed inside a vented shield 56 shown in FIG. 8. The shield is configured to induce an air flow by a Venturi effect in the direction of arrows 58 in FIG. 8. The shield 56 extends a small distance beyond the apertures 60 of the optical elements to form an outlet of a convergent nozzle. The inlet of the convergent nozzle consists of two symmetrical cavities 62 and 64 on each side of the shield. The emitter/detector 20 is thus completely encased by the shield except for part of its side wall 66 which forms a part of the nozzle inlets. A flow of air through the nozzle is induced in the direction of the arrows 58 when the vehicle is in motion due to the low pressure field which is created by the cross flow air. This induced air flow tends to reduce the likelihood of debris impinging and adhering to the optical element apertures 60 that would degrade the performance of the emitter/detector.

Figure 7:
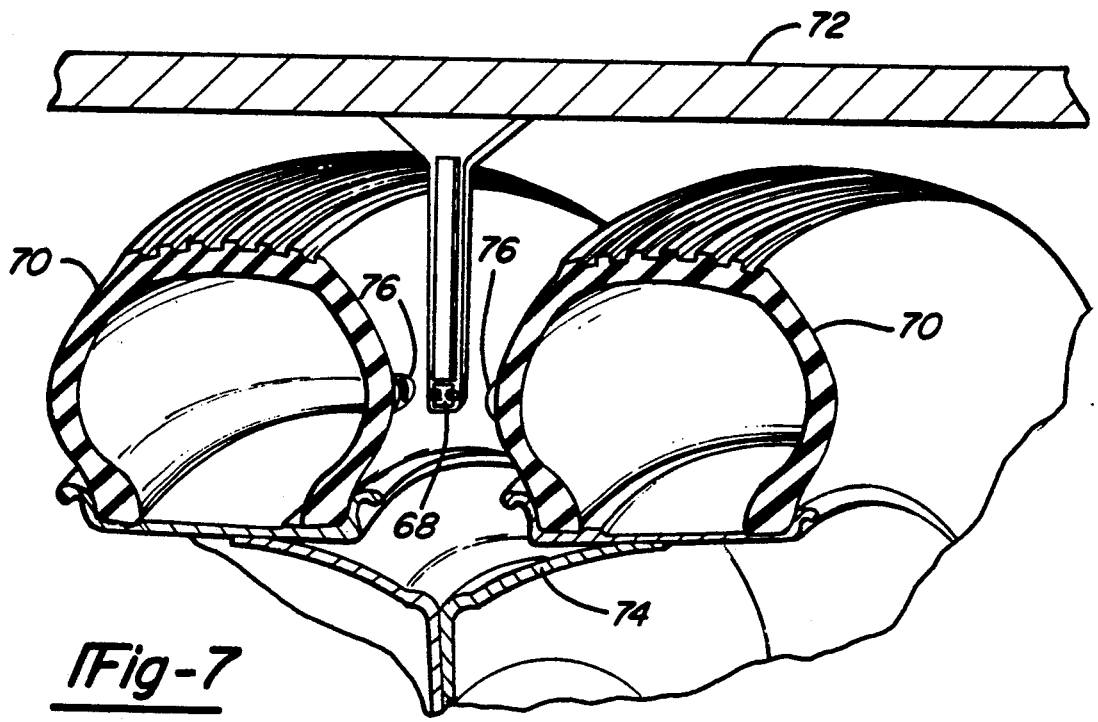
FIG. 7 is a sectional view showing the tire inflation pressure and temperature monitoring system of the present invention installed on a dual wheel axle.

FIG. 7 illustrates one way of implementing the tire pressure and temperature monitoring system of the present invention on a vehicle axle having dual wheels. A double emitter/detector 68 is positioned between the two tires 70 of the dual wheel axle and is mounted to a vehicle frame structure 72. The tires 70 are mounted to the dual wheel rim 74 in such a manner that the tire pressure indicators 76 on the tire side walls will both be facing the emitter/detector 68. In this case the fixed nonrotating structure 72 which supports the emitter/detector 68 may not share the same vehicle suspension component as the wheel axle. To allow for relative motion between the emitter/detector 68 and the indicators 76, the radial extent of the stripes 38 and 42 on the elastic diaphragm of the indicators can be made longer than the stripes used on tires in which the emitter/detector and indicator share a common suspension component.

During tire inflation pressure measuring, the laser diode emits electromagnetic pulses at a specific repetition rate that are continuously transmitted in the direction of the tire side wall. It is these pulses that are reflected back to the detector by the stripes of the indicator. For tire temperature sensing, only the detector is used. The emitting diode is turned off and the sensitivity threshold of the detector and associated electronics is set to read the background thermal emission from the tire.

Whereas the continuous monitoring of tire inflation pressure provides the vehicle operator primarily with long term trends in the conditions of the tires, the temperature monitoring is intended to provide primarily a warning of eminent danger. The most frequent occurrence involves one tire failure as opposed to all tires failing at the same time. Therefore, the economics of simplicity are employed by monitoring for temperature differences or anomalies between tires, rather than attempting to measure the tire absolute temperature. The temperature sensing identifies a tire whose thermal emission exceeds the average thermal emission of the rest of the tires by specified amounts.

Under normal conditions, all tires are expected to be within a few temperature degrees difference of each other. The average reading of all thermal emissions can be used as a reference for detecting temperature anomalies. Since each wheel revolution provides a rapid and repetitive input to the detectors, the average of the previous pass is used to compare with the specific signal from each wheel. As soon as an anomaly is detected, that specific temperature from the anomalous tire is eliminated from the average computation to be used subsequently. A typical temperature measurement period, for example, would be divided into four intervals. During the first interval an average thermal emission level is determined. During the second interval, the thermal emission from each tire is compared with the average. If an anomaly exceeding a predetermined amount is not found, the system bypasses the third and fourth intervals and repeats the first and second intervals. If an anomaly is found, a new average is determined during the third interval using all of the sensor readings except for the anomalous one. During the fourth interval, the value of the anomaly is updated by comparing the sensor input from the anomalous tire with the new average computed using the nonanomalous tires. When a predetermined difference in temperature is detected, an appropriate signal can be provided to the vehicle operator. For example, a thermal emission difference from the average that corresponds to 50° may indicate a "caution" while a 100° temperature difference may indicate a "warning".

Figure 6:
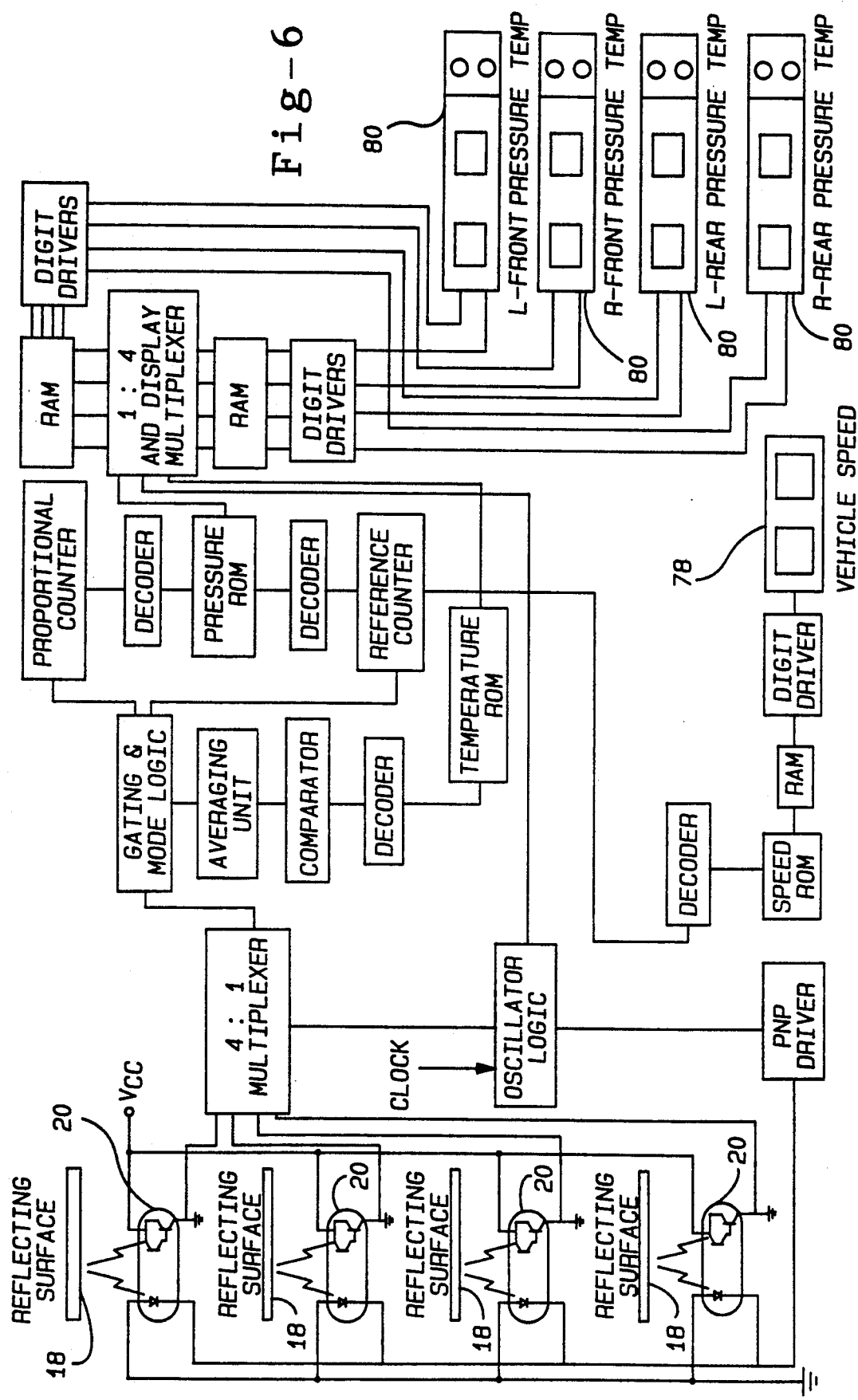
FIG. 6 is a schematic of the electrical system for monitoring the tire inflation pressure and tire temperature.
Figure 9:
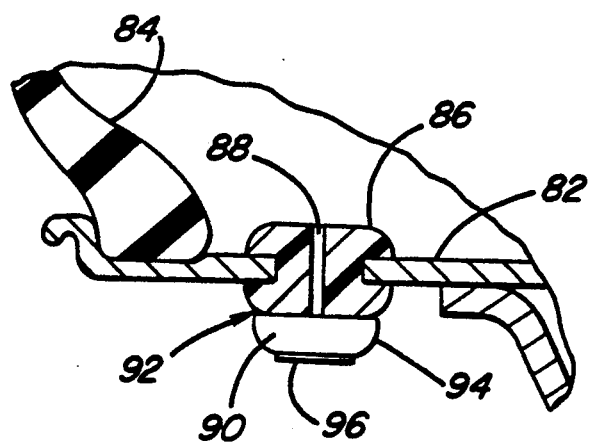
FIG. 9 is a sectional view of a rim and tire showing an alternative embodiment of a wheel rim mounted indicator used to measure inflation pressure.

The schematic diagram in FIG. 6 illustrates the electrical system used in the pressure and temperature monitoring system. Four emitter/detector assemblies 20 are shown, one for each tire on a four tire vehicle. The emitter/detectors 20 are used to emit and receive light impulses toward and from the reflective surfaces of the indicators 18 on each of the tires. The data from each detector can be decoded and transformed into pressure or temperature with a common set of electronics by means of a multiplexer and mode switching logic. The pressure data for each sensor is stored in a random access memory (RAM) after it is processed and can be subsequently displayed in a continuous manner. The RAM is updated periodically in accordance with the time sharing intervals established in the mode switching logic. In a like manner, during the temperature measurement mode, the calculated temperature anomaly is stored for display and updated in turn under the control of the mode logic. The individual wheel speed is available in the reference counter for other applications such as steering correction, anti-skid braking, navigational systems and vehicle speed and can be displayed to the driver through display 78. The tire pressure and temperature is displayed to the driver through the four separate displays 80. An alternative embodiment of the indicator is shown in FIG. 9. In FIG. 9, the indicator is placed in the rim 82 rather than in the side wall of a tire 84. An aperture is formed in the rim which is sealed by a plug 86 having a small aperture 88 therethrough. The aperture 88 provides communication between the inside of the tire and the cavity 90 in the inside of indicator 92. Indicator 92 includes a flexible diaphragm 94 with a plurality of reflective stripes 96. While the embodiment shown in FIG. 9 is not preferred in the sense that an additional puncture is required in the rim with the associated difficulties of sealing that puncture, such an embodiment would function identically to that disclosed above with indicators imbedded in the tire side wall.

Figure 11:
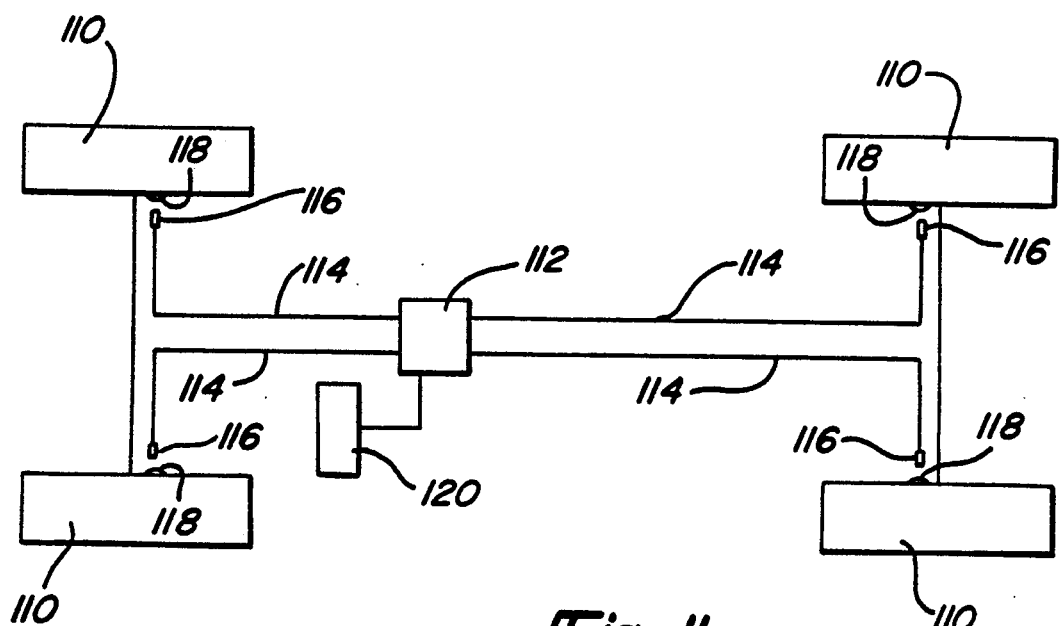
FIG. 11 is a schematic view showing an alternative embodiment of the present invention incorporating the light radiation source and detectors at a central location and utilizing fiber optic cables to transmit the electromagnetic radiation to and from each of the vehicle tires.

As an alternative to locating an emitter/detector assembly 20 adjacent each of the tires, an illumination source can be mounted at the single location on the vehicle and the light radiation transmitted to each wheel location by means of fiber optic cables. Such a system is shown schematically in FIG. 11. FIG. 11 shows a tire pressure monitoring system installed on a vehicle having four tires 110. The diode assembly and processor electronics 112 includes one or more light emitting diodes or other illumination source for the system. Fiber optic cables 114 are used to transmit the light radiation from the diode assembly and processor electronics 112 to separate fiber optic lenses 116 mounted to the vehicle suspension in fixed relation to the tires 110 and oriented to direct light radiation to the pressure indicators 118 contained in the side walls of the tires 110.

The reflected light energy from the stripes is transmitted from the tire back to the detector and processor electronics by the same fiber strand or another fiber strand in the cable 114. Once received, the signals are processed in the same manner as shown in FIG. 6 and the information is directed to display 120 for viewing by a vehicle operator. A suitable light source is the Motorola fiber optic emitter chip MFOEC-1200 and a suitable detector is the Motorola MFODC-1100.

Several advantages flow from the use of a fiber optic system as compared to the use of individual optoelectronic emitters and detectors located adjacent each tire. First, delicate diode chips used to produce the light and to sense the reflected light are not exposed to the extreme hot and cold temperatures and vibration that are found in the wheel wells but can be contained in a single protected location within the vehicle. Second, there are no electrical power or electrical signal cables extending to each wheel well of the vehicle, resulting in a system that is much less susceptible to electromagnetic noise. Third, a single common light source can be used to illuminate all wheel sites which may prove to be cost effective particularly with multi-axle vehicles. Fourth, with a common pulsating light source, the pulses to and from each wheel can be synchronized thereby providing an opportunity to determine differential wheel motions accurately for use in navigation systems, anti-lock braking or wheel slip monitoring.

The fiber optic transmitting cable 114 can also be used for transmitting infrared radiation from the tire side wall to the processor electronics for use in determining temperature anomalies of the tires. It may be necessary to include an additional fiber strand dedicated solely for transmitting the longer wave infrared radiation. This will depend upon the attenuation of the infrared wavelength by the fiber optic strand.

It can be seen that by the present invention, a tire pressure monitoring system can be provided for a vehicle that avoids the complexity of a radio frequency transmitter within each tire and the need for a power source to be mounted within the tires. As a result, the system of the present invention has overcome the principal disadvantage of previously developed tire pressure monitoring systems for moving vehicles.

It is to be understood that the invention is not limited to the exact construction or method illustrated and described above, but that various changes and modifications may be made without departing from the spirit and scope of the invention as defined in the following claims.

I claim:

1. A system for monitoring a rotating pneumatic tire of a vehicle comprising:

first means defining a reference time interval which is related to circumferential speed of the tire and which is mounted to the vehicle for rotation with the tire;

second means related to inflation of the tire defining an inflation measurement time interval which is related to circumferential speed of the tire and which is mounted to the vehicle for rotation with the tire;

sensor means mounted to a non-rotating component of the vehicle including an optoelectronic sensor, including emitter means for emitting electromagnetic radiation which is positioned in sensing relationship to the first means and the second means so that radiation emitted from said emitter means is reflected by said first and second means and is detected by said detector means; and said sensor means further comprising means for measuring via said optoelectronic sensor said reference time interval, means for sensing via said optoelectronic sensor said inflation measurement time interval and means for correlating the sensed inflation measurement and the reference time intervals to provide inflation pressure information for the rotating pneumatic tire, said sensing means being mounted to the vehicle so that said first and second means pass said sensor means with each rotation of the tire.

2. The monitoring system of claim 1 wherein said detector means includes additional means for detecting background infrared radiation naturally emitted from the tire as a function of tire temperature.

3. The monitoring system of claim 1 in which said means defining a reference time interval which rotates with the tire comprises a pair of radiation reflective stripes which are circumferentially spaced apart and positioned to receive radiation from said emitter means with each revolution of the tire and to reflect said radiation toward said detector means.

4. The monitoring system of claim 3 in which said means related to inflation of the tire defining an inflation measurement time interval which rotates with the tire comprises a pair of movable radiation reflective stripes which are circumferentially spaced apart and which are circumferentially movable relative to one another in accordance with tire inflation pressure and which are positioned to receive radiation from said emitter means with each revolution of the tire and to reflect said radiation toward said detector means;

said pair of radiation reflective strips defining said reference time interval being spaced apart a relatively small angular extent of the circumference, said pair of movable radiation reflection stripes defining said inflation measurement time interval being spaced apart a relatively small angular extent of the circumference, and said movable radiation reflection stripes defining said inflation measurement time interval being spaced from said radiation reflective stripes defining said reference time interval a relatively small angular extent of the circumference.

5. The monitoring system of claim 1 in which said means related to inflation of the tire defining an inflation measurement time interval which is related to circumferential speed and which rotates with the tire comprises a pair of movable radiation reflective stripes which are circumferentially spaced apart and which are circumferentially movable relative to one another in accordance with tire inflation pressure.

6. The monitoring system of claim 5 wherein said movable radiation reflective stripes are fixed to an elastic diaphragm defining a cavity; and further comprising means for providing fluid communication between said cavity and the interior of said tire whereby said diaphragm expands and contracts in relation to tire pressure moving said movable radiation reflective stripes defining said inflation measurement time interval relative to one another.

7. The monitoring system of claim 6 wherein said diaphragm has a center portion between said movable radiation reflective stripes defining said inflation measurement time interval which is of greater elasticity than the remainder of said elastic diaphragm.

8. The monitoring system of claim 6 wherein said movable radiation reflective stripes defining said inflation measurement time interval are formed of two joined surfaces generally perpendicular to one another forming a corner between said two joined surfaces.

9. The monitoring system of claim 6 wherein said diaphragm is mounted to a side wall of the tire with an aperture through the tire side wall to provide communication between the cavity defined by said elastic diaphragm and the interior of the tire.

10. The monitoring system of claim 6 wherein said diaphragm is mounted to a wheel rim carrying the tire with an aperture through the wheel rim to provide communication between the cavity defined by said elastic diaphragm and the interior of the tire.

11. The monitoring system of claim 1 wherein said emitter means of said optoelectronic sensor includes a laser diode disposed to emit light radiation directed toward said first and second means defining said reference time interval and said inflation measurement time interval.

12. The monitoring system of claim 11 wherein the detector means of said optoelectronic sensor includes a photo diode disposed to receive radiation reflected from said first and second means defining said reference time interval and said inflation measurement time interval to measure said reference and inflation measurement time intervals.

13. The monitoring system of claim 1 wherein the detector means of said optoelectronic sensor includes a photo transistor disposed to receive radiation reflected from said first and second means defining said reference time interval and said inflation measurement time interval to measure said reference and inflation measurement time intervals.

14. The monitoring system of claim 1 wherein said optoelectronic sensor is contained within a housing having one surface with apertures thereto for emission and reception of electromagnetic radiation from said optoelectronic sensor, and further comprising means surrounding said housing forming an airflow past said surface containing apertures when said housing is mounted to a moving vehicle in a direction away from said surface containing apertures.

15. The monitoring system of claim 1 wherein said optoelectronic sensor is located remotely of said rotating pneumatic tire and said sensor means includes a fiber optic cable means for transmitting radiation from said optoelectronic sensor to a lens disposed adjacent said pneumatic tire for directing the radiation toward said tire and for receiving the reflected radiation from said tire and transmitting said reflected radiation back to said optoelectronic sensor.

16. The monitoring system of claim 15 further comprising multiple optoelectronic sensors for monitoring multiple pneumatic tires, each of said tires including means defining a reference time interval and means defining an inflation measurement time interval, fiber optic cable means for transmitting radiation from said multiple optoelectronic sensors to said multiple tires and for receiving the reflected radiation from said tires and transmitting said reflected radiation back to said multiple optoelectronic sensors.

17. The monitoring system of claim 16 wherein said transmitted radiation is provided from a single radiation source and is distributed via said fiber optic cable means to lenses disposed adjacent to each of said multiple pneumatic tires.

18. A system for monitoring a rotating pneumatic tire comprising:
a first pair of radiation reflective stripes which rotate with the tire and which are circumferentially spaced apart to define a reference dimension;
a second pair of radiation reflective stripes which rotate with the tire and are circumferentially spaced apart and which are circumferentially movable relative to one another in accordance with tire inflation pressure;
an optoelectronic sensor adjacent said tire which does not rotate with the tire, said optoelectronic sensor including emitter means for emitting electromagnetic radiation toward said radiation reflective stripes as said stripes pass said sensor and detector means for detecting said electromagnetic radiation reflected by said radiation reflective stripes as said stripes pass said sensor; and
means for measuring a time interval between the passage of the first stripe of each of said pairs of radiation reflective stripes past said sensor and the passage of the second stripe of each of said pairs of radiation reflective stripes past said sensor and means for correlating the time interval between the two radiation reflective stripes of the first pair of radiation reflective stripes and the time interval between the two radiation reflective stripes of the second pair of radiation reflective stripes to provide inflation pressure information for the tire.

19. The measuring system of claim 18 wherein the radiation emitted from said sensor is pulsed at a constant frequency in the range between 50 kHz and 7 mHz whereby said detector means receives multiple reflected pulses of radiation from one of said radiation reflecting stripes passing said optoelectronic sensor.

20. The measuring system of claim 19 wherein said radiation reflective stripes have a circumferential width dimension which is correlated to the emitted constant pulse frequency so that at least ten pulses of the incident radiation are reflected into said detector means as one of said radiation reflective stripes passes said detector means when the tire is rotating at a speed within a predetermined range.

21. The measuring system of claim 18 wherein said means for detecting electromagnetic radiation includes means for detecting background thermal radiation from the tire.

22. A system for monitoring the rotating tires of a vehicle having multiple pneumatic tires comprising:
optoelectronic sensing means for each tire mounted to nonrotating structure of the vehicle in sensing relationship to said tires, said sensing means including means for measuring infrared emission from each tire;
means for generating an average infrared emission value from the infrared emission values of each tire; and
means for comparing the infrared emission values of each tire with said average value to determine the difference between each tire infrared emission value and said average value and noting an anomaly if the infrared emission value of any one tire exceeds said average value by more than a predetermined amount.

23. The system of claim 22 further comprising:
means for generating a revised average infrared emission value, when an anomaly is noted, from the infrared emission values of the tires whose infrared emission values do not exceed said average value by more than said predetermined amount; and
means for comparing the anomalous tire infrared emission value with said revised average value and means for providing a signal to a vehicle operator if the infrared emission value from the anomalous tire differs from said revised average value by more than a predetermined amount.

24. The tire monitoring system of claim 22 further comprising:
means defining a reference time interval of each tire which is related to circumferential speed and which rotates with each tire;
means related to inflation of each tire defining an inflation measurement time interval of each tire which is related to circumferential speed and which rotates with each tire; and
said sensing means further comprising means for sensing via said optoelectronic sensor said reference time interval, means for sensing via said optoelectronic sensor said inflation measurement time interval and means for correlating the inflation measurement and reference time intervals to provide inflation pressure information for each tire.

* * * * *

UNITED STATES PATENT AND TRADEMARK OFFICE
CERTIFICATE OF CORRECTION

PATENT NO. : 5,274,355
DATED : December 28, 1993
INVENTOR(S) : Louis Galan

It is certified that error appears in the above-indentified patent and that said Letters Patent is hereby corrected as shown below:

Column 9, line 38, Claim 1, after "radiation" please insert
--and detector means for detecting electromagnetic radiation--.

Signed and Sealed this

Twenty-sixth Day of July, 1994

Attest:

BRUCE LEHMAN

Attesting Officer

Commissioner of Patents and Trademarks